United States Patent
Dugas et al.

(10) Patent No.: US 10,093,877 B2
(45) Date of Patent: *Oct. 9, 2018

(54) TEMPERATURE CONTROLLED ADSORPTION PROCESS FOR RECOVERING CONDENSABLE COMPONENTS FROM A GAS STREAM

(71) Applicant: Dow Global Technologies LLC, Midland, MI (US)

(72) Inventors: Ross E. Dugas, Pearland, TX (US); Ajay N. Badhwar, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/514,908

(22) PCT Filed: Oct. 20, 2015

(86) PCT No.: PCT/US2015/056313
§ 371 (c)(1),
(2) Date: Mar. 28, 2017

(87) PCT Pub. No.: WO2016/069316
PCT Pub. Date: May 6, 2016

(65) Prior Publication Data
US 2017/0233669 A1    Aug. 17, 2017

Related U.S. Application Data

(60) Provisional application No. 62/068,794, filed on Oct. 27, 2014.

(51) Int. Cl.
*B01D 53/047* (2006.01)
*B01D 53/06* (2006.01)
(Continued)

(52) U.S. Cl.
CPC ............ *C10L 3/101* (2013.01); *B01D 53/047* (2013.01); *B01D 53/0462* (2013.01); *B01D 53/06* (2013.01); *B01J 20/267* (2013.01); *B01J 20/28004* (2013.01); *B01J 20/28064* (2013.01); *B01J 20/28066* (2013.01); *B01J 20/3441* (2013.01); *B01D 2253/102* (2013.01);
(Continued)

(58) Field of Classification Search
None
See application file for complete search history.

(56) References Cited

U.S. PATENT DOCUMENTS 2,495,342 A   1/1950  Gilliland
4,040,990 A * 8/1977  Neely .................... B01D 53/02
                                                    521/142

(Continued)

FOREIGN PATENT DOCUMENTS

GB          2057910 A     4/1981

*Primary Examiner* — Tam M Nguyen (57) ABSTRACT

Disclosed is an improved process for recovering condensable components from a gas stream, in particular, hydrocarbons from a gas stream such as natural gas. The present process uses solid adsorbent media to remove said hydrocarbons wherein the adsorbent media is regenerated in a continuous fashion in a heated continuous counter-current regeneration system, wherein said heated regenerated adsorbent media is cooled prior to reuse.

6 Claims, 4 Drawing Sheets

(51) Int. Cl.
*C10L 3/10* (2006.01)
*B01J 20/26* (2006.01)
*B01J 20/28* (2006.01)
*B01D 53/04* (2006.01)
*B01J 20/34* (2006.01)

(52) U.S. Cl.
CPC .. *B01D 2253/104* (2013.01); *B01D 2253/106* (2013.01); *B01D 2253/108* (2013.01); *B01D 2253/112* (2013.01); *B01D 2253/202* (2013.01); *B01D 2253/206* (2013.01); *B01D 2253/304* (2013.01); *B01D 2253/306* (2013.01); *B01D 2253/311* (2013.01); *B01D 2256/245* (2013.01); *B01D 2257/702* (2013.01); *B01D 2257/7022* (2013.01); *B01D 2259/40088* (2013.01); *B01D 2259/40094* (2013.01); *C10L 2290/12* (2013.01); *C10L 2290/542* (2013.01)

(56) References Cited

U.S. PATENT DOCUMENTS

| | | |
|---|---|---|
| 4,297,220 A | 10/1981 | Meitzner et al. |
| 4,382,124 A | 5/1983 | Meitzner et al. |
| 4,564,644 A | 1/1986 | Harris |
| 4,950,332 A | 8/1990 | Stringfield et al. |
| 4,965,083 A | 10/1990 | Norman et al. |
| 5,079,274 A | 1/1992 | Schneider et al. |
| 5,104,530 A * | 4/1992 | Maroldo .................. B01J 20/20 210/198.2 |
| 5,288,307 A | 2/1994 | Goltz et al. |
| 5,509,956 A | 4/1996 | Opperman et al. |
| 5,946,816 A | 9/1999 | Smith |
| 6,726,746 B2 | 4/2004 | Dai et al. |
| 9,944,872 B2 * | 4/2018 | Matteucci .............. B01J 20/267 |
| 2005/0211090 A1 | 9/2005 | McCullough |
| 2011/0315012 A1 | 12/2011 | Kuznicki et al. |
| 2012/0222552 A1* | 9/2012 | Ravikovitch ...... B01D 53/0438 95/97 |
| 2014/0298992 A1* | 10/2014 | Carruthers ............. C12M 47/18 95/139 |

* cited by examiner

TEMPERATURE CONTROLLED
ADSORPTION PROCESS FOR RECOVERING
CONDENSABLE COMPONENTS FROM A
GAS STREAM

FIELD OF THE INVENTION

The present invention relates to an improved continuous process using a solid adsorbent media for recovering condensable components, such as one or more of ethane and heavier hydrocarbons, from a gas stream, wherein said adsorbent media is regenerated, cooled, and reused.

BACKGROUND OF THE INVENTION

Various continuous vapor adsorption processes have been developed utilizing an adsorber wherein one or more bed comprising adsorbent media is utilized for capturing VOCs and other contaminates from a gas stream. In these systems, a gas stream is fed into the adsorber wherein contaminants from the gas stream are captured in the adsorbent media. After the contaminants are adsorbed, the loaded adsorbent media passes through a regenerator wherein the loaded adsorbent media is heated and the contaminants are released. After regeneration, the heated adsorbtion media is returned to the adsorber to be reused for capturing contaminates from the gas stream.

Typically, the rate of heated adsorbent media returning to the adsorber is small relative to the rate of the inlet gas fed into the adsorber. In such a process, the gas feed stream cools the heated regenerated adsorbent media such that the temperature increase to the adsorbent beds is acceptable and does not affect the capacity of the adsorbent to remove contaminates.

However, in the case of natural gas liquid (NGL) separation from a natural gas stream the concentration of heavier hydrocarbons is high. In this case the rate of hot adsorbent fed into the adsorber from the regenerator may be large compared to the feed rate of the natural gas stream. In such a case, the temperature of the adsorbent bed may be too high for effective NGL adsorbtion.

There is a need for an improved adsorptions process for recovering condensable components such as NGLs from a gas stream, particularly, a natural gas stream.

SUMMARY OF THE INVENTION

The present invention is an improved adsorption process for recovering condensable components from a gas stream.

One embodiment of the present invention is an improved continuous process for separating hydrocarbons from a gas feedstream comprising methane and one or more of ethane, propane, butane, pentane, or heavier hydrocarbons, comprising the steps of: (a) providing one or more adsorbent bed comprising an adsorbent media, preferably silica gel, alumina, silica-alumina, zeolites, activated carbon, polymer supported silver chloride, copper-containing resins, porous cross-linked polymeric adsorbents, pyrolized macroporous polymers, or mixtures thereof, wherein said adsorbent media adsorbs one or more of ethane, propane, butane, pentane, heavier hydrocarbons, and/or mixtures thereof, (b) passing the gas feedstream through the one or more adsorbent bed to provide a methane rich gas stream and a loaded adsorbent media, (c) recovering, transporting, liquefying, combusting, or flaring the methane rich gas stream, (d) using heat to regenerate the loaded adsorbent media to produce a heated regenerated adsorbent media and a product gas comprising desorbed ethane, propane, butane, pentane, heavier hydrocarbons, and/or mixtures thereof, preferably by using heated gas and/or a radiant heat contact exchanger, more preferably by a using a pressure swing adsorption (PSA) process, a temperature swing adsorption (TSA) process, or a combination thereof, and even more preferably by a using a microwave heating system, (e) recovering, transporting, liquefying, re-injecting, excluding, by-passing, combusting, or flaring the desorbed ethane, propane, butane, heavier hydrocarbons, and/or pentane individually and/or as mixtures, (f) cooling the heated regenerated adsorbent media in a cooling unit, preferably a direct cooling unit, more preferably an indirect cooling unit, to form a cooled regenerated adsorbent media wherein the temperature of the cooled regenerated adsorbent media is equal to or greater than 10° F. cooler than the temperature of the heated regenerated adsorbent media prior to entering the cooling unit, and (g) introducing the cooled regenerated adsorbent media back into the adsorption bed for reuse.

In a preferred embodiment of the process described here in above, the adsorption media is a porous cross-linked polymeric adsorbent, a pyrolized macroporous polymer, or mixtures thereof and the regeneration of the loaded adsorbent media is achieved by a using a microwave heating system.

DETAILED DESCRIPTION OF THE INVENTION

The present invention is an improved process to remove condensable components from a gas stream, for example gas streams from a refinery operation, petrochemical operation, or other operations, preferably the gas stream is a natural gas steam. The present process is particularly suitable for gas streams comprising mixtures of two or more of methane, ethane, propane, butane, and/or heavier hydrocarbons. The gas stream may further comprise gasses common to gas streams such as, but not limited to, carbon dioxide ($CO_2$), hydrogen sulfide ($H_2S$), sulfur dioxide ($SO_2$), carbon disulfide ($CS_2$), hydrogen cyanide (HCN), carbonyl sulfide (COS), mercaptans, ethylene, propylene, butenes, and the like.

Raw natural gas comes from three types of wells: oil wells, gas wells, and condensate wells. Natural gas that comes from oil wells is typically termed "associated gas". This gas can exist separate from oil in the formation (free gas), or dissolved in the crude oil (dissolved gas). Natural gas from gas and condensate wells, in which there is little or no crude oil, is termed "non-associated gas". Gas wells typically produce raw natural gas by itself, while condensate wells produce free natural gas along with a semi-liquid hydrocarbon condensate. Whatever the source of the natural gas, once separated from crude oil (if present) it commonly exists in mixtures with other hydrocarbons; principally ethane, propane, butane, and pentanes and to a lesser extent heavier hydrocarbons.

Raw natural gas often contain a significant amount of impurities, such as water or acid gases, for example carbon dioxide ($CO_2$), hydrogen sulfide ($H_2S$), sulfur dioxide ($SO_2$), carbon disulfide ($CS_2$), hydrogen cyanide (HCN), carbonyl sulfide (COS), or mercaptans as impurities. The term "natural gas feedstream" as used in the method of the present invention includes any natural gas source, raw or raw natural gas that has been treated one or more times to remove water and/or other impurities.

The terms "natural gas liquids" (NGL) and "ethane plus" ($C_2$+) refer broadly to hydrocarbons having two or more carbons such as ethane, propane, butane, and possibly small quantities of pentanes or heavier hydrocarbons. Preferably, NGL have a methane concentration of 5 mol percent or less.

The term "methane-rich" refers broadly to any vapor or liquid stream, e.g., after fractionation from which ethane plus amounts have been recovered. Thus, a methane-rich stream has a higher concentration of $C_1$ than the concentration of $C_1$ in associated and non-associated natural gas. Preferably, the concentration increase of $C_1$ is from removal of at least a portion of one or more heavier hydrocarbons.

Suitable adsorbents for use in the process of the present invention are solids having a microscopic structure. The internal surface of such adsorbents is preferably between 100 to 2000 $m^2/g$, more preferably between 500 to 1500 $m^2/g$, and even more preferably between 1000 to 1300 $m^2/g$. The nature of the internal surface of the adsorbent in the adsorbent bed is such that light hydrocarbons ($C_2$ and $C_3$) and heavier hydrocarbons ($C_4$+) are adsorbed. Suitable adsorbent media include materials based on silica, silica gel, alumina or silica-alumina, zeolites, activated carbon, polymer supported silver chloride, copper-containing resins. Most preferred adsorbent media is a porous cross-linked polymeric adsorbent or a partially pyrolized macroporous polymer. Preferably, the internal surface of the adsorbent is non-polar.

In one embodiment, the process of the present invention uses an adsorbent media to extract NGLs from a natural gas stream. The mechanism by which the macroporous polymeric adsorbent extracts the NGLs from the natural gas stream is a combination of adsorption and absorption; the dominating mechanism at least is believed to be adsorption. Accordingly, the terms "adsorption" and "adsorbent" are used throughout this specification, although this is done primarily for convenience. The invention is not considered to be limited to any particular mechanism.

When an adsorbent media has adsorbed any amount of $C_2$+ hydrocarbons it is referred to as "loaded". Loaded includes a range of adsorbance from a low level of hydrocarbons up to and including saturation with adsorbed hydrocarbons.

The term "macroporous" is used in the art interchangeably with "macroreticular" and refers in general to pores with diameters of 500 Å or greater. "Mesopores" are characterized as pores of between 50 Angstroms and larger but less than 500 angstroms. "Micropores" are characterized as pores of less than 50 Angstroms. The engineered distribution of these types of pores gives rise to the desired properties of high adsorption capacity for NGLs and ease of desorption of NGLs under convenient/practical chemical engineering process modifications (increase in temperature or reduced pressure [vacuum]). The process giving rise to the distribution of micropores, mesopores and macropores can be achieved in various ways, including forming the polymer in the presence of an inert diluent or other porogen to cause phase separation and formation of micropores by post cross-linking.

In one embodiment, the adsorbent media of the process of the present invention is a macroporous polymeric adsorbent of the present invention is a post cross-linked polymeric synthetic adsorbents engineered to have high surface area, high pore volume and high adsorption capacities as well as an engineered distribution of macropores, mesopores and micropores. Preferably, the macroporous polymeric adsorbent of the present invention is hypercrosslinked and/or methylene bridged having the following characteristics: a BET surface area of equal to or greater than 500 $m^2/g$ and preferably equal to or greater than 1,000 $m^2/g$, and having a particle size of 300 microns to 1500 microns, preferably 500 to 1200 microns.

Examples of monomers that can be polymerized to form macroporous polymeric adsorbents useful are styrene, alkylstyrenes, halostyrenes, haloalkylstyrenes, vinylphenols, vinylbenzyl alcohols, vinylbenzyl halides, and vinylnaphthalenes. Included among the substituted styrenes are ortho-, meta-, and para-substituted compounds. Specific examples are styrene, vinyltoluene, ethylstyrene, t-butylstyrene, and vinyl benzyl chloride, including ortho-, meta-, and para-isomers of any such monomer whose molecular structure permits this type of isomerization. Further examples of monomers are polyfunctional compounds. One preferred class is polyvinylidene compounds, examples of which are divinylbenzene, trivinylbenzene, ethylene glycol dimethacrylate, divinylsulfide and divinylpyridine. Preferred polyvinylidene compounds are di- and trivinyl aromatic compounds. Polyfunctional compounds can also be used as crosslinkers for the monomers of the first group.

One preferred method of preparing the polymeric adsorbent is by swelling the polymer with a swelling agent, then crosslinking the polymer in the swollen state, either as the sole crosslinking reaction or as in addition to crosslinking performed prior to swelling. When a swelling agent is used, any pre-swelling crosslinking reaction will be performed with sufficient crosslinker to cause the polymer to swell when contacted with the swelling agent rather than to dissolve in the agent. The degree of crosslinking, regardless of the stage at which it is performed, will also affect the porosity of the polymer, and can be varied to achieve a particular porosity. Given these variations, the proportion of crosslinker can vary widely, and the invention is not restricted to particular ranges. Accordingly, the crosslinker can range from 0.25% of the polymer to 45%. Best results are generally obtained with 0.75% to 8% crosslinker relative to the polymer, the remaining (noncrosslinking) monomer constituting from 92% to 99.25% (all percentages are by weight).

Other macroporous polymeric adsorbents useful in the practice of this invention are copolymers of one or more monoaromatic monomers with one or more nonaromatic monovinylidene monomers. Examples of the latter are methyl acrylate, methyl methacrylate and methylethyl acrylate. When present, these nonaromatic monomers preferably constitute less than 30% by weight of the copolymer.

The macroporous polymeric adsorbent is prepared by conventional techniques, examples of which are disclosed in various United States patents. Examples are U.S. Pat. Nos. 4,297,220; 4,382,124; 4,564,644; 5,079,274; 5,288,307;

4,950,332; and 4,965,083. The disclosures of each of these patents are incorporated herein by reference in their entirety.

For polymers that are swollen and then crosslinked in the swollen state, the crosslinking subsequent to swelling can be achieved in a variety of ways, which are further disclosed in the patents cited above. One method is to first haloalkylate the polymer, and then swell it and crosslink by reacting the haloalkyl moieties with aromatic groups on neighboring chains to form an alkyl bridge. Haloalkylation is achieved by conventional means, an example of which is to first swell the polymer under non-reactive conditions with the haloalkylating agent while including a Friedel-Crafts catalyst dissolved in the haloalkylating agent. Once the polymer is swollen, the temperature is raised to a reactive level and maintained until the desired degree of haloalkylation has occurred. Examples of haloalkylating agents are chloromethyl methyl ether, bromomethyl methyl ether, and a mixture of formaldehyde and hydrochloric acid. After haloalkylation, the polymer is swelled further by contact with an inert swelling agent. Examples are dichloroethane, chlorobenzene, dichlorobenzene, ethylene dichloride, methylene chloride, propylene dichloride, and nitrobenzene. A Friedel-Crafts catalyst can be dissolved in the swelling agent as well, since the catalyst will be used in the subsequent crosslinking reaction. The temperature is then raised to a level ranging from 60° C. to 85° C. in the presence of the catalyst, and the bridging reaction proceeds. Once the bridging reaction is complete, the swelling agent is removed by solvent extraction, washing, drying, or a combination of these procedures.

The pore size distribution and related properties of the finished adsorbent can vary widely and no particular ranges are critical to the invention. In most applications, best results will be obtained at a porosity (total pore volume) within the range of from 0.5 to 1.5 cc/g of the polymer. A preferred range is 0.7 to 1.3 cc/g. Within these ranges, the amount contributed by macropores (i.e., pores having diameters of 500 Å or greater) will preferably range from 0.025 to 0.6 cc/g, and most preferably from 0.04 to 0.5 cc/g. The surface area of the polymer, as measured by nitrogen adsorption methods such as the well-known BET method, will in most applications be within the range of 150 to 2100 $m^2/g$, and preferably from 400 to 1400 $m^2/g$. The average pore diameter will most often range from 10 Å to 100 Å.

The form of the macroporous polymeric adsorbent is likewise not critical and can be any form which is capable of containment and contact with a flowing compressed air stream. Granular particles and beads are preferred, ranging in size from 50 to 5,000 microns, with a range of 500 to 3,000 microns particularly preferred. Contact with the adsorbent can be achieved by conventional flow configurations of the gas, such as those typically used in fluidized beds or packed beds. The adsorbent can also be enclosed in a cartridge for easy removal and replacement and a more controlled gas flow path such as radial flow.

The macroporous polymeric adsorbent can function effectively under a wide range of operating conditions. The temperature will preferably be within any range which does not cause further condensation of vapors or any change in physical or chemical form of the adsorbent. Preferred operating temperatures are within the range of from 5° C. to 150° C., and most preferably from 10° C. to 125° C. In general, operation at ambient temperature or between ambient temperature and 20° C. to 100° C. above ambient will provide satisfactory results. The pressure of the natural gas stream entering the adsorbent bed can vary widely as well, preferably extending from 2 psig (115 kPa) to 1000 psig (7000 kPa). The pressure will generally be dictated by the plant unit where the product gas will be used. A typical pressure range is from 100 psig (795 kPa) to 300 psig (2170 kPa). The residence time of the natural gas stream in the adsorbent bed will most often range from 10 seconds to 2 minutes and preferably from 0.5 minute to 1 minute. Finally, the relative humidity can have any value up to 100%, although for convenience, the preferred range of relative humidity is 25% to 98%.

The macroporous polymeric adsorbents of the present invention described herein above can be used to separate ethane, propane, butane, pentane, and heaver hydrocarbons from mixed gases. Preferably, the macroporous polymeric adsorbents of the present invention adsorb equal to or greater than 60 $cm^3$ STP of propane per gram of sorbent at 35° C. and 500 mmHg of propane. Preferably, the adsorbents of the present invention adsorb equal to or greater than 60 $cm^3$ STP of n-butane per gram of sorbent at 35° C. and 100 mmHg of n-butane. Furthermore, these materials are able to be degassed of propane or n-butane and then able to readsorb equal to or greater than 60 $cm^3$ STP of propane per gram of sorbent at 35° C. and 500 mmHg of propane or readsorb greater than 60 $cm^3$ STP of n-butane per gram of sorbent at 35° C. and 100 mmHg of n-butane at least once. Preferably, the adsorbents of the present invention adsorb equal to or greater than 30 $cm^3$ STP of ethane per gram of sorbent at 35° C. and 600 mmHg of ethane. Preferably, the adsorbents of the present invention adsorb equal to or greater than 100 $cm^3$ STP of pentane per gram of sorbent at 35° C. and 50 mmHg of pentane.

In another embodiment, the process of the present invention uses a pyrolized macroporous polymeric adsorbent media to extract NGLs from a natural gas stream.

Pyrolized macroporous polymeric adsorbent media are well known, for instance see U.S. Pat. No. 4,040,990, incorporated by reference herein in its entirety. Partially pyrolyzed particles, preferably in the form of beads or spheres, produced by the controlled decomposition of a synthetic polymer of specific initial porosity. In a preferred embodiment, the pyrolyzed particles are derived from the thermal decomposition of macroreticular ion exchange resins containing a macroporous structure.

In general pyrolysis comprises subjecting the starting polymer to controlled temperatures for controlled periods of time under certain ambient conditions. The primary purpose of pyrolysis is thermal degradation while efficiently removing the volatile products produced.

The maximum temperatures may range from 300° C. to up to 900° C., depending on the polymer to be treated and the desired composition of the final pyrolyzed particles. Higher temperature, e.g., 700° C. and higher result in extensive degradation of the polymer with the formation of molecular sieve sized pores in the product.

Most desirably, thermal decomposition (alternatively denoted "pyrolysis" or "heat treatment") is conducted in an inert atmosphere comprised of, for example, argon, neon, helium, nitrogen, or the like, using beads of macroreticular synthetic polymer substituted with a carbon-fixing moiety which permits the polymer to char without fusing in order to retain the macroreticular structure and give a high yield of carbon. Among the suitable carbon-fixing moieties are sulfonate, carboxyl, amine, halogen, oxygen, sulfonate salts, carboxylate salts and quaternary amine salts. These groups are introduced into the starting polymer by well-known conventional techniques, such as those reactions used to functionalize polymers for production of ion exchange resins. Carbon-fixing moieties may also be produced by imbibing a reactive precursor thereof into the pores of macroreticular polymer which thereupon, or during heating, chemically binds carbon-fixing moieties onto the polymer. Examples of these latter reactive precursors include sulfuric acid, oxidizing agents, nitric acid, Lewis acids, acrylic acid, and the like.

Suitable temperatures for practicing the process of this invention are generally within the range of 300° C. to 900° C., although higher temperatures may be suitable depending upon the polymer to be treated and the desired composition of the final pyrolyzed product. At temperatures above 700° C. the starting polymer degrades extensively with the formation of molecular sieve sized pores in the product, i.e., 4 to 6 A average critical dimension, yielding a preferred class of adsorbents according to this invention. At lower temperatures, the thermally-formed pores usually range from 6 A to as high as 50 A in average critical size. A preferred range of pyrolysis temperatures is between 400° C. and 800° C. As will be explained more fully hereinafter, temperature control is essential to yield a partially pyrolyzed material having the composition, surface area, pore structures and other physical characteristics of the desired product. The duration of thermal treatment is relatively unimportant, providing a minimum exposure time to the elevated temperature is allowed.

A wide range of pyrolyzed resins may be produced by varying the porosity and/or chemical composition of the starting polymer and also by varying the conditions of thermal decomposition. In general, the pyrolyzed resins of the invention have a carbon to hydrogen ratio of 1.5:1 to 20:1, preferably 2.0:1 to 10:1, whereas activated carbon normally has a C/H ratio much higher, at least greater than 30:1 (Carbon and Graphite Handbook, Charles L. Mantell, Interscience Publishers, N.Y. 1968, p. 198). The product particles contain at least 85% by weight of carbon with the remainder being principally hydrogen, alkali metals, alkaline earth metals, nitrogen, oxygen, sulfur, chlorine, etc., derived from the polymer or the functional group (carbon-fixing moiety) contained thereon and hydrogen, oxygen, sulfur, nitrogen, alkali metals, transition metals, alkaline earth metals and other elements introduced into the polymer pores as components of a filler (may serve as a catalyst and/or carbon-fixing moiety or have some other functional purpose).

The pore structure of the final product must contain at least two distinct sets of pores of differing average size, i.e., multimodal pore distribution. The larger pores originate from the macroporous resinous starting material which preferably contains macropores ranging from between 50 to 100,000 Å in average critical dimension. The smaller pores, as mentioned previously, generally range in size from 4 to 50 Å, depending largely upon the maximum temperature during pyrolysis. Such multimodal pore distribution is considered a novel and essential characteristic of the composition of the invention.

The pyrolyzed polymers useful in the process of the present invention have relatively large surface area resulting from the macroporosity of the starting material and the smaller pores developed during pyrolysis. In general the overall surface area as measured by nitrogen adsorption ranges between 50 and 1500 m$^2$/gram. Of this, the macropores will normally contribute 6 to 700 m$^2$/gram, preferably 6 to 200 m$^2$/g, as calculated by mercury intrusion techniques, with the remainder contributed by the thermal treatment. Pore-free polymers, such as "gel" type resins which have been subjected to thermal treatment in the prior art do not contribute the large pores essential to the adsorbents of the invention nor do they perform with the efficiency of the pyrolyzed polymers described herein.

The duration of pyrolysis depends upon the time needed to remove the volatiles from the particular polymer and the heat transfer characteristics of the method selected. In general, the pyrolysis is very rapid when the heat transfer is rapid, e.g., in an oven where a shallow bed of material is pyrolyzed, or in a fluidized bed. To prevent burning of the pyrolyzed polymer, normally the temperature of the polymer is reduced to not more than 400° C., preferably not more than 300° C., before the pyrolyzed material is exposed to air. The most desirable method of operation involves rapid heating to the maximum temperature, holding the temperature at the maximum for a short period of time (in the order of 0 to 20 minutes) and thereafter quickly reducing the temperature to room temperature before exposing the sample to air. Products according to the invention have been produced by this preferred method by heating to 800° C. and cooling in a period of 20 to 30 minutes. Longer holding periods at the elevated temperatures are also satisfactory, since no additional decomposition appears to occur unless the temperature is increased.

Activating gases such as $CO_2$, $NH_3$, $O_2$, $H_2O$ or combinations thereof in small amounts tend to react with the polymer during pyrolysis and thereby increase the surface area of the final material. Such gases are optional and may be used to obtain special characteristics of the adsorbents.

The starting polymers which may be used to produce the pyrolyzed resins of the invention include macroreticular homopolymers or copolymers of one or more monoethylenically or polyethylenically unsaturated monomers or monomers which may be reacted by condensation to yield macroreticular polymers and copolymers. The macroreticular resins used as precursors in the formation of macroreticular heat treated polymers are not claimed as new compositions of matter in themselves. Any of the known materials of this type with an appropriate carbon-fixing moiety is suitable. The preferred monomers are those aliphatic and aromatic materials which are ethylenically unsaturated.

Examples of suitable monoethylenically unsaturated monomers that may be used in making the granular macroreticular resin include: esters of acrylic and methacrylic acid such as methyl, ethyl, 2-chloroethyl, propyl, isobutyl, isopropyl, butyl, tert-butyl, sec-butyl, ethylhexyl, amyl, hexyl, octyl, decyl, dodecyl, cyclohexyl, isobornyl, benzyl, phenyl, alkylphenyl, ethoxymethyl, ethoxyethyl, ethoxypropyl, propoxymethyl, propoxyethyl, propoxypropyl, ethoxyphenyl, ethoxybenzyl, ethoxycyclohexul, hydroxyethyl, hydroxypropyl, ethylene, propylene, isobutylene, diisobutylene, styrene, ethylvinylbenzene, vinyltoluene, vinylbenzylchloride, vinyl chloride, vinyl acetate, vinylidene chloride, dicyclopentadiene, acrylonitrile, methacrylonitrile, acrylamide, methacrylamide, diacetone acrylamide, functional monomers such as vinylbenzene, sulfonic acid, vinyl esters, including vinyl acetate, vinyl propionate, vinyl butyrate, vinyl laurate, vinyl ketones including vinyl methyl ketone, vinyl ethyl ketone, vinyl isopropyl ketone, vinyl n-butyl ketone, vinyl hexyl ketone, vinyl octyl ketone, methyl isopropenyl ketone, vinyl aldehydes including acrolein, methacrolein, crotonaldehyde, vinyl ethers including vinyl methyl ether, vinyl ethyl ether, vinyl propyl ether, vinyl isobutyl ether, vinylidene compounds including vinylidene chloride bromide, or bromochloride, also the corresponding neutral or half-acid half-esters or free diacids of the unsaturated dicarboxylic acids including itaconic, citraconic, aconitic, fumaric, and maleic acids, substituted acrylamides, such as N-monoalkyl, —N,N-dialkyl-, and N-dialkylaminoalkylacrylamides or methacrylamides where the alkyl groups may have from one to eighteen carbon atoms, such as methyl, ethyl, isopropyl, butyl, hexyl, cyclohexyl, octyl, dodecyl, hexadecyl and octadecyl aminoalkyl esters of acrylic or methacrylic acid, such as β-dimethylaminoethyl, β-diethylaminoethyl or 6-dimethylaminohexyl acrylates and methacrylates, alkylthioethyl methacrylates and acrylates such as ethylthioethyl methacrylate, vinylpyridines, such as 2-vinylpyridine, 4-vinylpyridine, 2-methyl-5-vinylpyridine, and so on.

In the case of copolymers containing ethylthioethyl methacrylate, the products can be oxidized to, if desired, the corresponding sulfoxide or sulfone.

Polyethylenically unsaturated monomers which ordinarily act as though they have only one such unsaturated group, such as isoprene, butadiene, and chloroprene, may be used as part of the monoethylenically unsaturated category.

Examples of polyethylenically unsaturated compounds include: divinylbenzene, divinylpyridine, divinylnaphthalenes, diallyl phthalate, ethylene glycol diacrylate, ethylene glycol dimethacrylate, trimethylolpropanetrimethacrylate, divinylsulfone, polyvinyl or polyallyl ethers of glycol, of glycerol, of pentaerythritol, of diethyleneglycol, of monothio or dithio-derivatives of glycols, and of resorcinol, divinylketone, divinylsylfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, trivinylbenzene, trivinylnaphthalenes, and polyvinylanthracenes.

A preferred class of monomers of this type is aromatic ethylenically unsaturated molecules such as styrene, vinyl pyridine, vinyl naphthalene, vinyl toluene, phenyl acrylate, vinyl xylenes, and ethylvinylbenzene.

Examples of preferred polyethylenically unsaturated compounds include divinyl pyridine, divinyl naphthalene, divinylbenzene, trivinylbenzene, alkyldivinylbenzenes having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus. Besides the homopolymers and copolymers of these poly(vinyl) benzene monomers, one or more of them may be copolymerized with up to 98% (by weight of the total monomer mixture) of (1) monoethylenically unsaturated monomers, or (2) polyethylenically unsaturated monomers other than the poly(vinyl) benzenes just defined, or (3) a mixture of (1) and (2). Examples of the alkyl-substituted di- and tri-vinyl-benzenes are the various vinyltoluenes, the divinylethylbenzene, 1,4-divinyl-2,3,5,6-tetramethylbenzene, 1,3,5-trivinyl-2,4,6-trimethylbenzene, 1,4-divinyl, 2,3,6-triethylbenzene, 1,2,4-trivinyl-3,5-diethylbenzene, 1,3,5-trivinyl-2-methylbenzene.

Most preferred are copolymers of styrene, divinylbenzene, and ethylvinylbenzene.

Examples of suitable condensation monomers include: (a) aliphatic dibasic acids such as maleic acid, fumaric acid, itaconic acid, 1,1-cyclobutanedicarboxylic acid, etc.; (b) aliphatic diamines such as piperazine, 2-methylpiperazine, cis, cis-bis (4-aminocyclohexyl) methane, metaxylylenediamine, etc.; (c) glycols such as diethylene glycol, triethylene glycol, 1,2-butanediol, neopentyl glycol etc.; (d) bischloroformates such as cis and trans-1,4-cyclohexyl bischloroformate, 2,2,2,4-tetramethyl-1,3-cyclobutyl bischloroformate and bischloroformates of other glycols mentioned above, etc.; (e) hydroxy acids such as salicylic acid, m- and p-hydroxy-benzoic acid and lactones, derived therefrom such as the propiolactones, valerolactones, caprolactones, etc.; (f) diisocyanates such as cis and trans-cyclopropane-1,2-diisocyanate, cis and trans-cyclobutane-1-2-diisocyanate etc.; (g) aromatic diacids and their derivatives (the esters, anhydrides and acid chlorides) such as phthalic acid, phthalic anhydride, terephthalic acid, isophthalic acid, dimethylphthalate, etc.; (h) aromatic diamines such as benzidine, 4,4'-methylenediamine, bis(4-aminophenyl) ether, etc.; (i) bisphenols such as bisphenol A, bisphenol C, bisphenol F, phenolphthalein, recorcinol, etc.; (j) bisphenol bis(chloroformates) such as bisphenol A bis(chloroformate), 4,4'-dihydroxybenzophenone bis(chloroformate) etc.; (k) carbonyl and thiocarbonyl compounds such as formaldehyde, acetaldehyde, thioacetone acetone, etc.; (l) phenol and derivatives such as phenol, alkylphenols, etc.; (m) polyfunctional cross-linking agents such as tri or poly basic acids such as trimellitic acid, tri or polyols such as glycerol, tri or polyamines such as diethylenetriamine; and other condensation monomers and mixtures of the foregoing.

Ion exchange resins produced from aromatic and/or aliphatic monomers provide a preferred class of starting polymers for production of porous adsorbents. The ion exchange resin may also contain a functional group selected from cation, anion, strong base, weak base, sulfonic acid, carboxylic acid, oxygen containing, halogen and mixtures of the same. Further, such ion exchange resins may optionally contain an oxidizing agent, a reactive substance, sulfuric acid, nitric acid, acrylic acid, or the like at least partially filling the macropores of the polymer before heat treatment.

The synthetic polymer may be impregnated with a filler such as carbon black, charcoal, bonechar, sawdust or other carbonaceous material prior to pyrolysis. Such fillers provide an economical source of carbon which may be added in amounts up to 90% by weight of the polymer.

The starting polymers, when ion exchange resins, may optionally contain a variety of metals in their atomically dispersed form at the ionic sites. These metals may include iron, copper, silver, nickel, manganese, palladium, cobalt, titanium, zirconium, sodium, potassium, calcium, zinc, cadmium, ruthenium, uranium and rare earths such as lanthanum. By utilizing the ion exchange mechanism it is possible for the skilled technician to control the amount of metal that is to be incorporated as well as the distribution.

Although the incorporation of metals onto the resins is primarily to aid their ability to serve as catalytic agents, useful adsorbents may also contain metal.

Synthetic polymers, ion exchange resins whether in the acid, base or metal salt form are commercially available. According to the invention there is also provided an adsorption process for separating components from a gaseous or liquid medium which comprises contacting the medium with particles of a pyrolyzed synthetic polymer.

For example it has been discovered that a styrenedivinylbenzene based strongly acidic exchange resin pyrolyzed from any of the forms of Hydrogen, Iron (III), Copper (II), Silver (I) or Calcium (II) can decrease the concentration of vinylchloride in air preferably dry air from initial concentration of 2 ppm to 300,000 ppm to a level of less than 1 ppm at flow rates of 1 bedvolume/hour to 600 bedvolume/min. preferably 10 to 200 bedvolume/minute.

The partially pyrolyzed macroporous polymer adsorbent useful in process of the present invention disclosed herein above are able to adsorb greater than 10 cm$^3$ STP of ethane per gram of sorbent at 35° C. and 200 mmHg of ethane and greater than 20 cm$^3$ STP of propane per gram of sorbent at 35° C. and 100 mmHg of propane. Furthermore, these materials are able to be degassed of ethane or propane and then able to readsorb greater than 10 cm$^3$ STP of ethane per gram of sorbent at 35° C. and 200 mmHg of ethane, or readsorb greater than 20 cm$^3$ STP of propane per gram of sorbent at 35° C. and 100 mmHg of propane one or more times.

In the process of the present invention, the adsorption of hydrocarbons by the adsorbing media is a reversible process. The practice of removing volatiles from a loaded adsorption media can be accomplished by any suitable means, typically by reducing the pressure over the media, heating, or the combination of reduced pressure and heating. In either case the desired outcome is to re-volatilize the trapped vapors, and subsequently remove them from the adsorbent media so that it can be reused to capture additional volatiles. Preferably, the adsorption media of the present invention when regenerated desorbs adsorbed gases in an amount equal to or greater than 25 percent of the amount adsorbed, more preferably equal to or greater than 50 percent, and more preferably equal to or greater than 80 percent of the NGLs adsorbed.

Traditional means of heating adsorbent media for the purpose of removing adsorbed volatiles that utilize conventional heating systems such as heated gas (air or inert gas), or radiant heat contact exchangers are suitable for use in the present NGL separation process as part of the adsorbent media regeneration step, for example, by a pressure swing adsorption (PSA) process, a temperature swing adsorption (TSA) process, or a combination thereof. Preferably, the hydrocarbon (for example NGLs) separation process of the present invention employs a microwave heating system as part of the adsorbent media regeneration step. Such a microwave heating system provides a heating system and method for removing volatiles from adsorbent media with higher thermal efficiency at a reduced cost.

In one embodiment of the process of the present invention, the adsorbent is cycled through different adsorption and desorption units.

Figure 1:
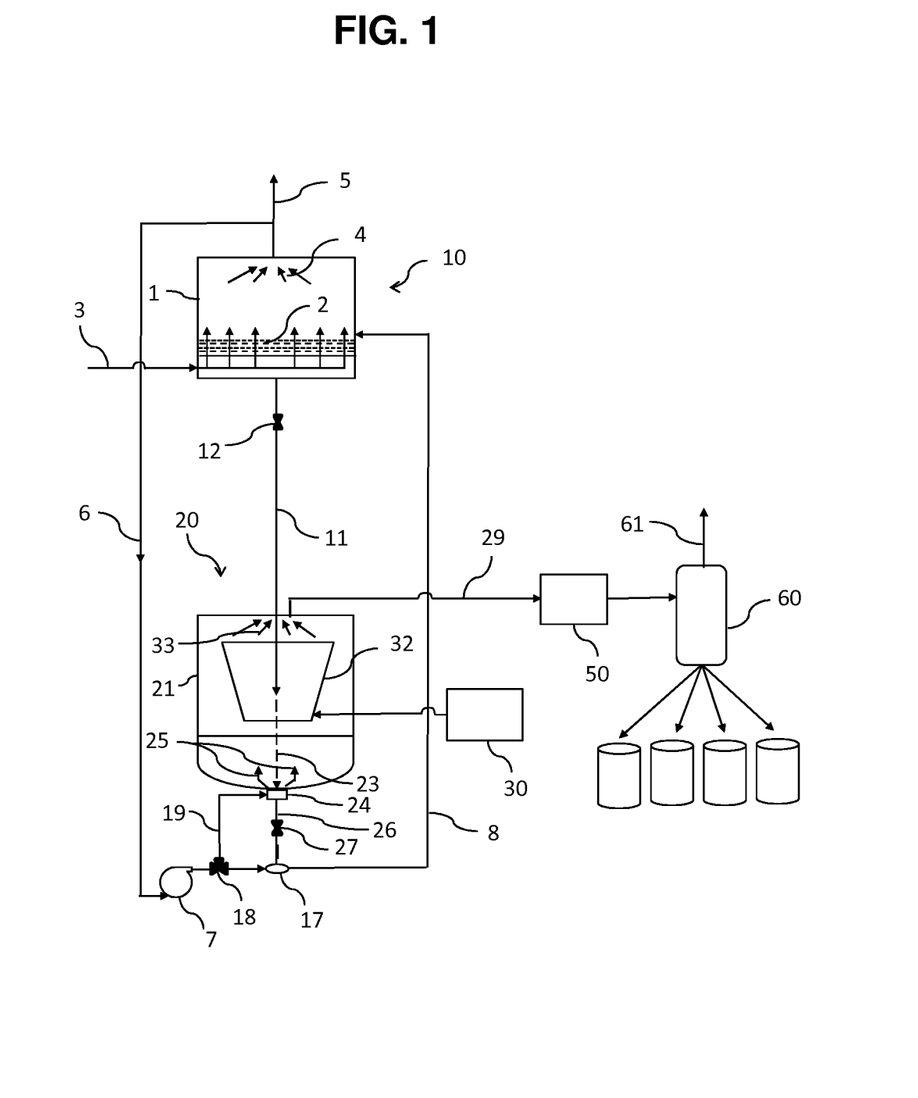
FIG. 1 is a schematic of a conventional process for recovering condensable components from a gas stream comprising a heated regenerated adsorbent media.

Now referring to the diagrams, one embodiment of a known adsorbent media continuous process for removing hydrocarbons (e.g., natural gas liquids) from a gas feedstream is shown in FIG. 1. In the separation process a gas feedstream is passed 3 into an adsorption unit 10 comprising an adsorbent bed 2 comprising an adsorbent media which adsorbs one or more of ethane and heavier hydrocarbons ($C_2$, $C_3$, $C_4$, $C_5$, etc.) to obtain a methane rich gas product 4 which is discharged 5 (recovered, transported through pipeline or other means, liquefied, flared, combusted, or the like). The adsorbent loaded with one or more of ethane and heavier hydrocarbons is transporting 11 from the adsorption unit 10 to a counter-current regeneration unit 20.

The counter-current regeneration unit comprises a means 32 to regenerate the loaded adsorbent media and produce regenerated product gas 33 comprising the desorbed one or more of ethane and heavier hydrocarbons and optionally stripping gas 25. Said counter-current regeneration unit comprises a heating means 30, and optionally the ability to provide stripping gas 25, whereby causing the release of one or more of ethane and heavier hydrocarbons from the loaded adsorbing media and forming heated regenerated adsorbent media 23. The heated regenerated adsorption media 23 exits the bottom of the counter-current regeneration unit 21 and regenerated product gas 33 exits the top of the counter-current regeneration unit 21. The heated regenerated adsorbent media 23 is transported through line 8 to the adsorption unit 10 for reuse. The released product gas 33 comprising one or more ethane and heavier hydrocarbons is discharged through line 29, (e.g., recovered, re-injected, excluded, by-passed, combusted, or flared) as either as a mixture or individually as gas (e.g., as $C_2$, $C_3$, $C_4$, $C_5$, etc.). In the process shown in FIG. 1, the release product gas is passed through a compressor 50, into a condenser (or knockout) 60 where one or more of the ethane and heavier hydrocarbons are liquefied and recovered either as a mixture or individually as separate liquids and any uncondensed gas (such as $C_1$ and/or $C_2$) is discharged (recovered, flared, or the like) 61.

The hydrocarbon separation process of the present invention is a continuous process with continuous adsorbent media regeneration. To provide continuous operation, there is a valve 12 in line 11 between the adsorber tank 1 and the regeneration tank 21 and a valve 27 in the line 26 between the regeneration tank 21 and collection tank 17. Valves 12 and 27 are synchronized to allow for holding loaded adsorption media from the adsorption tank 1 while adsorption media is being regenerated in the regenerator unit 20. When the adsorption media is regenerated in the regenerator tank 21, valve 27 allows the heated regenerated adsorption media 23 to pass from the bottom of the regeneration tank 21 through line 26 into the holding tank 17 and then transported through line 8 to the adsorption tank 1. A portion of the methane rich gas from the top of the adsorber tank 1 may be circulated via line 6 through blower 7 to transport the heated regenerated adsorption media 23 through line 8 to the adsorption tank 1 to once again adsorb NGLs from a gas feedstream 3. Valve 12 is synchronized with valve 27 to allow loaded adsorption media to enter the regenerator tank 21 to be regenerated. This process is repeated and allows for a continuous regeneration of the adsorption media.

If a stripping gas 25 is utilized, it is typically, but not limited to, a portion of the methane rich gas 4 from the top of the adsorber tank 1 circulated via line 6 through blower 7, valve 18, line 19, and into the bottom of the regeneration tank 21 to facilitate stripping adsorbed hydrocarbons from the loaded adsorbent media.

Figure 2:
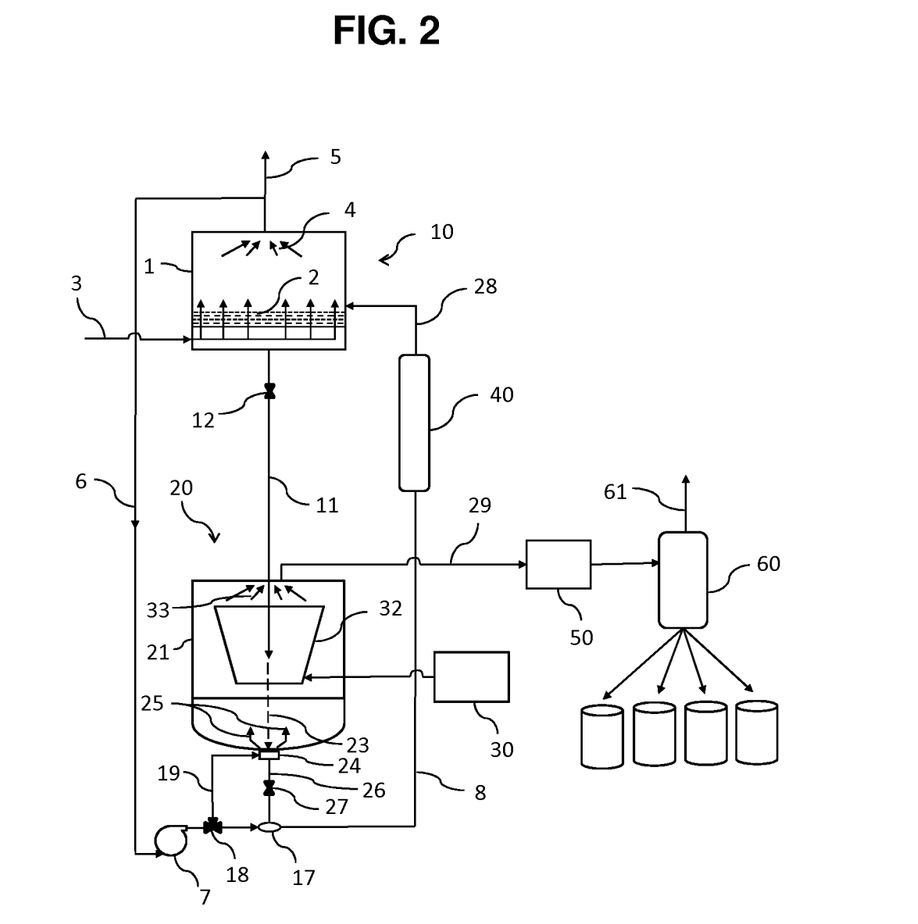
FIG. 2 is a schematic of one embodiment of a process for recovering condensable components from a gas stream comprising a cooled regenerated adsorbent media according to the present invention.

Referring to FIG. 2, one embodiment of the continuous separation process of the present invention for removing hydrocarbons (e.g., natural gas liquids) from a gas feedstream is shown. The process is the same as shown in FIG. 1 with the additional step that the heated regenerated adsorbent media 23 is cooled after exiting the regenerator 20 and prior to reentering the adsorber 10. In one case (not shown in the drawings) the heated regenerated adsorbent media may be cooled after leaving the regenerator 20 and prior to the holding tank 17. As shown in FIG. 2, the heated regenerated adsorbent media 23 is transported through line 8 to a cooling unit, for example an indirect cooling unit comprising fin cooling, 40 wherein the heated regenerated adsorbent media 23 is cooled to a cooled regenerated adsorbent media 28. The cooled regenerated adsorbent media 28 is returned to the adsorption unit 10 for reuse.

Figure 3:
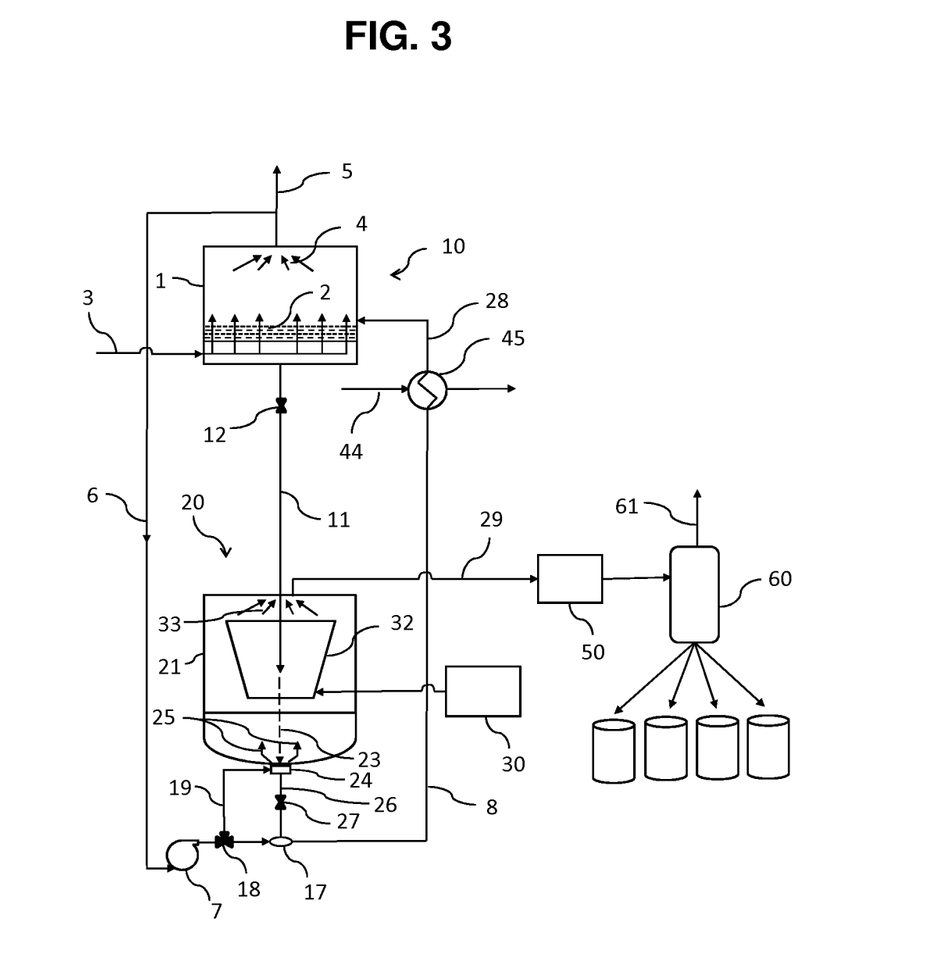
FIG. 3 is a schematic of another embodiment of a process for recovering condensable components from a gas stream comprising a cooled regenerated adsorbent media according to the present invention.

Now referring to FIG. 3, another embodiment of the continuous separation process of the present invention for removing hydrocarbons (e.g., natural gas liquids) from a gas feedstream is shown. The process is the same as shown in FIG. 1 with the additional step that the heated regenerated adsorbent media 23 is transported through line 8 to a cooling unit, for example an indirect cooling unit comprising a heat exchanger, 45 to form cooled regenerated adsorbent media 28. The indirect cooling unit 45 utilizes a fluid stream 44 to remove heat from the heated regenerated adsorbent media 23 to form the cooled regenerated adsorbent media 28. The cooled regenerated adsorbent media 28 is returned to the adsorption unit 10 for reuse.

In a preferred embodiment of the process of the present invention, the counter-current regeneration unit 20 comprises a microwave heating system 32 with a microwave power source 30.

In the process of the present invention heated regenerated adsorption media is cooled in a cooling unit. The cooling unit may employ direct cooling and/or indirect cooling.

Direct cooling is defined herein as cooling that occurs between two fluid streams (gas and/or liquid) wherein the heat is exchanged directly from one fluid stream to the other by the two fluid streams coming in direct physical contact with each other. For example the heated regenerated adsorbent media of the present invention may be cooled by contacting it directly with a liquid, such as water or a liquid hydrocarbon or a gas, such as air, product gas, or the like.

Indirect cooling is defined herein as cooling that occurs between two fluid streams wherein the streams that are exchanging heat don't physically contact each other directly, but each contact a heat transfer medium. Suitable indirect cooling units may be a liquid-liquid heat exchanger or a liquid-gas heat exchanger wherein the heat exchange may be a tube in tube heat exchanger, a tube in shell heat exchanger, plate and frame heat exchanger, a cross exchanger, or the like. Alternatively, the cooling may occur through fin cooling with no forced flow.

A cooling unit as defined herein is equipment with a key design aspect intended to facilitate heat transfer. Suitable cooling units may incorporate either direct or indirect cooling as defined above. For example, an internally or externally cooled auger system for transporting hot adsorbent back to the adsorber is a cooling unit as defined herein. Another example of a cooling unit of the present invention is an added cooling device to an existing system, such as a heat exchange wrap surrounding existing piping. Piping where no specific design considerations are implemented to enhance heat transfer is not include a cooling unit as defined herein.

Preferably the cooled regenerated adsorbent media coming out of the cooling unit is equal to or greater than 10° F. cooler than the temperature of the heated regenerated adsorbent media entering the cooling unit, more preferably the cooled regenerated adsorbent media coming out of the cooling unit is equal to or greater than 20° F. cooler than the temperature of the heated regenerated adsorbent media entering the cooling unit, more preferably the cooled regenerated adsorbent media coming out of the cooling unit is equal to or greater than 40° F. cooler than the temperature of the heated regenerated adsorbent media entering the cooling unit, more preferably the cooled regenerated adsorbent media coming out of the cooling unit is equal to or greater than 60° F. cooler than the temperature of the heated regenerated adsorbent media entering the cooling unit, more preferably the cooled regenerated adsorbent media coming out of the cooling unit is equal to or greater than 80° F. cooler than the temperature of the heated regenerated adsorbent media entering the cooling unit, more preferably the cooled regenerated adsorbent media coming out of the cooling unit is equal to or greater than 100° F. cooler than the temperature of the heated regenerated adsorbent media entering the cooling unit.

While only two particular and preferred embodiments of the process of the present invention are described in the diagrams, it should now be apparent to those skilled in the art, how alternative embodiments may implement the purposes of the present invention. As such, the invention can only be construed and limited in its breadth by the scope of the claims that follow.

Examples

Results for Comparative Example A and Example 1 are created using a heat and material balance Excel-based tool specifically designed for NGL separation with adsorbents. For a defined separation the tool calculates the equilibrium temperature of the adsorber by accounting for the mass flow rate, temperature and heat capacity of both the feed gas and the adsorbent entering the adsorber. The equilibrium adsorber temperature calculation also incorporates the heat generated from hydrocarbons condensing from the vapor phase to a liquid phase on the surface of the adsorbent.

For Comparative Example A and Example 1 a feed gas is passed through a porous cross-linked polymeric adsorbent media to provide a $CH_4$ rich stream (dry gas) and a heavy hydrocarbon stream (rich gas). The compositional make-up of each stream is shown in Table 1.

TABLE 1

|  |  | Feed Gas | Dry Gas | Rich Gas |
| --- | --- | --- | --- | --- |
| Gas Flow | MMSCFD | 10 | 8.91 | 1.09 |
| Pressure | psi | 500 | 490 |  |
| Temperature | ° F. | 70 |  |  |
| Methane | mol % | 71 | 79.3 | 3.3 |
| Ethane | mol % | 19 | 20.3 | 8.7 |
| Propane | mol % | 8 | 0.4 | 69.8 |
| Butane | mol % | 2 | 0 | 18.2 |

It is desired for this adsorption separation to utilize a delta loading (rich minus lean) of the adsorbent of 0.15 lb hydrocarbon/lb adsorbent. The ability and ease of performing this separation is defined by the temperature of the adsorber since the adsorbent has a much greater hydrocarbon carrying capacity at colder temperatures.

Comparative Example A and Example 1 show the adsorbent bed temperature for a non-cooled adsorbent and a cooled adsorbent, respectively.

In Comparative Example A there is no adsorbent cooling. The adsorbent enters the adsorber at 225° F. Comparative Example A results in the adsorber temperature equilibrating at 192° F.

In Example 1 the adsorbent is cooled and enters the adsorber at 100° F. Example 1 results in the adsorber temperature equilibrating at 132° F.

Adsorbent and adsorber temperatures for Comparative Example A and Example 1 are summarized in Table 2.

TABLE 2

|  | Adsorbent Cooling | Adsorbent Feed Temp | Adsorber Temp |
| --- | --- | --- | --- |
| Comparative Example A | No | 225° F. | 192° F. |
| Example 1 | Yes | 100° F. | 132° F. |

Figure 4:
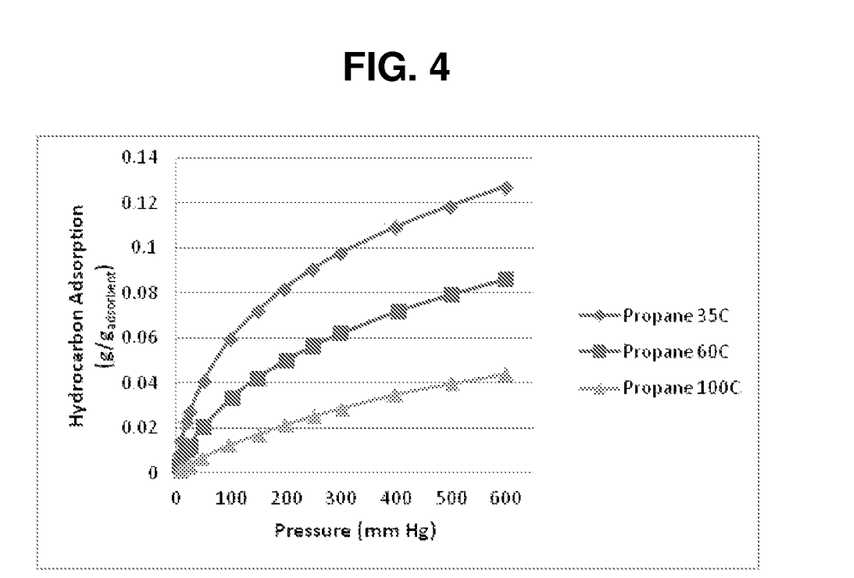
FIG. 4 is an adsorbtion equilibrium plot versus temperature for propane.

FIG. 4 shows the adsorbent efficiency for an adsorbent to adsorbed propane at three temperatures: 35° C., 60° C., and 100° C.

Figure 5:
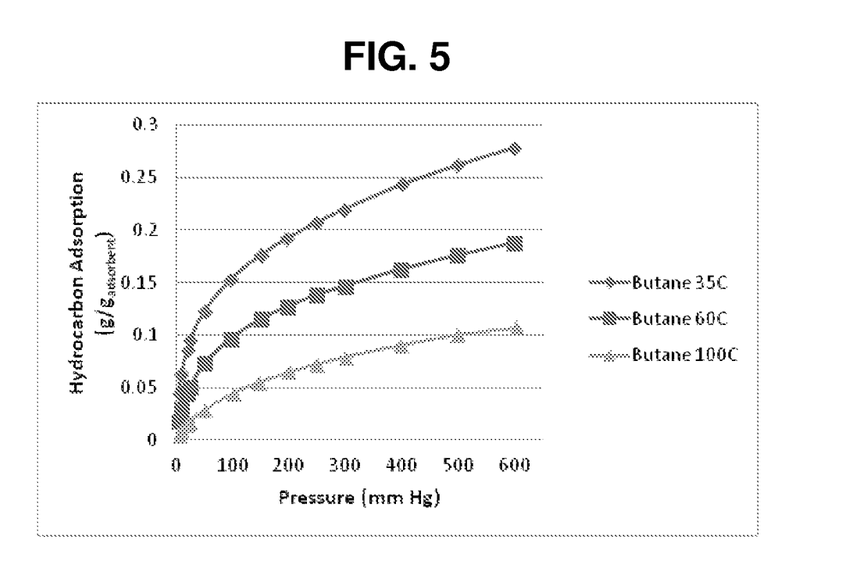
FIG. 5 is an adsorbtion equilibrium plot versus temperature for butane.

FIG. 5 shows the adsorbent efficiency for an adsorbent to adsorb butane at three temperatures: 35° C., 60° C., and 100° C.

As can be seen, the adsorbent is more efficient adsorbing propane and butane the lower the temperature.

What is claimed is:

1. A continuous process for separating hydrocarbons from a gas feedstream comprising methane and one or more of ethane, propane, butane, pentane, or heavier hydrocarbons, consisting of the steps of:

(a) providing one or more adsorbent bed consisting of an adsorbent media selected from a porous cross-linked polymeric adsorbent, a pyrolized macroporous polymer, or mixtures thereof, wherein said adsorbent media adsorbs one or more of ethane, propane, butane, pentane, heavier hydrocarbons, and/or mixtures thereof, (b) passing the gas feedstream through the one or more adsorbent bed to provide a methane rich gas stream and a loaded adsorbent media, (c) recovering, transporting, liquefying, combusting, or flaring the methane rich gas stream, (d) using a heat to regenerate the loaded adsorbent media to produce a heated regenerated adsorbent media and a product gas comprising one or more desorbed ethane, propane, butane, pentane, heavier hydrocarbons, and/or mixtures thereof, (e) recovering, transporting, liquefying, re-injecting, excluding, by-passing, combusting, or flaring the one or more desorbed ethane, propane, butane, pentane, and/or heavier hydrocarbons individually and/or as mixtures, (f) cooling the heated regenerated adsorbent media in a cooling unit to form a cooled regenerated adsorbent media wherein the temperature for the cooled regenerated adsorbent media is equal to or greater than 10° F. cooler than the temperature of the heated regenerated adsorbent media prior to entering the cooling unit, and (g) introducing the cooled regenerated adsorbent media back into the adsorption bed for reuse.

2. The process of claim 1 wherein the cooling unit is an indirect cooling unit.

3. The process of claim 1 wherein the cooling unit is a direct cooling unit.

4. The process of claim 1 wherein the heating means for regenerating the loaded adsorbent is a heated gas and/or a radiant heat contact exchanger.

5. The process of claim 1 wherein the regeneration of the loaded adsorbent media is achieved by a using a pressure swing adsorption (PSA) process, a temperature swing adsorption (TSA) process, or a combination thereof.

6. The process of claim 1 wherein the heating means for regenerating the loaded adsorbent media is a microwave heating system.

* * * * *